United States Patent
Mao et al.

(10) Patent No.: US 12,531,498 B2
(45) Date of Patent: Jan. 20, 2026

(54) SENSORLESS CONTROL METHOD OF PERMANENT MAGNET SYNCHRONOUS MOTOR

(71) Applicant: ZHEJIANG UNIVERSITY OF TECHNOLOGY, Zhejiang (CN)

(72) Inventors: Jianfeng Mao, Zhejiang (CN); Yinghao Hu, Zhejiang (CN); Xu Zhang, Zhejiang (CN); Fujiong Zhao, Zhejiang (CN); Hongjin Chen, Zhejiang (CN); Yuchen Wang, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 136 days.

(21) Appl. No.: 18/433,474

(22) Filed: Feb. 6, 2024

(65) Prior Publication Data
US 2025/0253788 A1    Aug. 7, 2025

(51) Int. Cl.
| H02P 21/14 | (2016.01) |
| H02P 21/13 | (2006.01) |
| H02P 21/18 | (2016.01) |
| H02P 21/22 | (2016.01) |

(52) U.S. Cl.
CPC .............. *H02P 21/13* (2013.01); *H02P 21/18* (2016.02); *H02P 21/22* (2016.02); *H02P 2207/055* (2013.01)

(58) Field of Classification Search
CPC .......... H02P 21/22; H02P 21/18; H02P 21/13; H02P 2207/055
USPC ..................................................... 318/400.02
See application file for complete search history.

(56) References Cited

U.S. PATENT DOCUMENTS

| 2003/0015988 | A1* | 1/2003 | Giuseppe | ................ H02P 21/13 318/727 |
| 2014/0327380 | A1* | 11/2014 | Magee | .................... H02P 21/32 318/400.32 |
| 2020/0119680 | A1* | 4/2020 | Yoo | .......................... H02P 6/28 |
| 2021/0165011 | A1* | 6/2021 | Thyagarajan | .......... G05B 15/02 |

* cited by examiner

*Primary Examiner* — Gabriel Agared
(74) *Attorney, Agent, or Firm* — JCIPRNET

(57) ABSTRACT

A sensorless control method and a system for PMSM based on Luenberger observer. The system includes a power supply circuit, a sampling circuit, a main control circuit and a drive circuit. The power supply circuit supplies power to other circuits. The sampling circuit is used to obtain the three-phase current of the motor. The main control circuit outputs the control signal to the drive circuit to run the PMSM. The present invention uses an improved method for selecting the feedback coefficient of Luenberger observer, which makes the selection of Luenberger observer feedback coefficient more convenient and effective. Moreover, it can select optimal parameters globally based on this method, leading to adaptive adjustment of feedback coefficients for better observer performance when the rotational speed influences the position of the pole of the observer.

8 Claims, 10 Drawing Sheets

SENSORLESS CONTROL METHOD OF PERMANENT MAGNET SYNCHRONOUS MOTOR

TECHNICAL FIELD

The present disclosure belongs to the technical field of PMSM (permanent magnet synchronous motor) control, and specifically relates to a sensorless control method and system of PMSM based on a new Luenberger observer.

BACKGROUND

PMSM has the advantages of good dynamic response, large torque and high efficiency, which is widely used in the power machinery field. In order to realize the accurate control of PMSM, it is necessary to obtain accurate rotor position. Therefore, the position sensor is used by the traditional method to obtain rotor position. But this traditional method has some disadvantages, such as low reliability, vulnerability to external environment, additional cost and weight, and so on. For sensorless motors, the rotor position can be obtained through the signal of back electromotive force (back-EMF), using sensorless control algorithm. More specifically, the estimated rotor speed and angle can be obtained by the position observer, which needs the physical quantities such as voltage and current. As for sensorless motors, the cost of the device is relatively low, and its sensitivity to evironmental conditions is reduced, making the PMSM control more reliable. In recent years, the sensorless control algorithm has been greatly promoted in the field of motor control due to its superiority.

Luenberger observer is a linear full-order state observer, which has the advantages of fast dynamic response and high estimation accuracy. In the sensorless control of PMSM, Luenberger observer is commonly used to estimate the rotor position. The key of designing Luenberger observer is to select the appropriate feedback coefficients which have a great influence on the rotor position estimation accuracy as well as its convergence rate. However, because of the nonlinear characteristics of PMSM system, it is difficult to use the pole placement method (PPM) to get the feedback coefficients. Usually, the feedback coefficients are obtained by using the trial-and-error method, which may be costly and time consuming. In addition, when the rotational speed changes, the pole position of the observer system may undergo significant changes, which may greatly reduce the performance of the observer. Therefore, the feedback coefficients need to be adjusted automatically and efficiently to ensure the high performance of the observer.

SUMMARY

In view of the problems described in the above section of background, the present disclosure is to provide a sensorless control method and system based on the Luenberger observer that is improved by proposed parameter selection method of obtaining optimal feedback coefficients. When the rotational speed affects the pole position, the feedback coefficients are automatically and efficiently adjusted to get better observer performance.

The present disclosure provides the technical solution as follows:

A sensorless control method of PMSM based on Luenberger observer includes the following steps:

Step 1: Taking sample of the three-phase current of the PMSM in real-time.

Step 2: Changing the three-phase current into the current under the stationary two-phase coordinate system.

Step 3: Constructing the Luenberger observer according to the resistance and inductance of the motor as well as the current and voltage under the two-phase stationary coordinate system.

Step 4: Calculating and selecting the appropriate feedback coefficient with the proposed selection method, and completing the construction of the Luenberger observer.

Step 5: Obtaining the estimated back-EMF through the Luenberger observer. Then calculating the estimated electrical angle by PLL (phase-locked loop), and consequently the estimated angular velocity can be obtained by this electrical angle.

Step 6: Establishing a speed closed-loop by using the estimated rotor position and the estimated speed. Meanwhile, obtaining the stator current under the two-phase rotational coordinate system, and then constructing the current closed-loop to obtain the stator voltage under the two-phase rotational coordinate system.

Step 7: Modulating SVPWM by using the stator voltage and the estimated rotor position under the two-phase rotational coordinate system. Then the controller outputs the corresponding PWM signal to the drive circuit, so that the motor stator generates a suitable rotating magnetic field to drag the rotor, and the sensorless FOC (Field Oriented Control) of the PMSM is completed.

As a further technical solution, the proposed coefficient selection method of the Luenberger observer in step 4 is described as follows:

The voltage balance equation of the surface-mounted PMSM in the stationary two-phase coordinate system is:

$$\begin{cases} u_\alpha = Ri_\alpha + L\dfrac{di_\alpha}{dt} - \omega\varphi_f \sin\theta \\ u_\beta = Ri_\beta + L\dfrac{di_\beta}{dt} - \omega\varphi_f \cos\theta \end{cases}$$

Where L is phase inductance of the motor, R is phase resistance of the motor, ω is the electric angular velocity of rotor, $\varphi_f$ is the magnetic chain of stator. The back-EMF $\omega\varphi_f \sin\theta$ and $\omega\varphi_f \cos\theta$ are recorded as $e_\alpha$ and $e_\beta$, and rewrite the above formula as the state space expression of the PMSM as follows:

$$\begin{bmatrix} \dfrac{di_\alpha}{dt} \\ \dfrac{di_\beta}{dt} \\ \dfrac{de_\alpha}{dt} \\ \dfrac{de_\beta}{dt} \end{bmatrix} = \begin{bmatrix} -\dfrac{R}{L} & 0 & -\dfrac{1}{L} & 0 \\ 0 & -\dfrac{R}{L} & 0 & -\dfrac{1}{L} \\ 0 & 0 & 0 & -\omega \\ 0 & 0 & \omega & 0 \end{bmatrix} \begin{bmatrix} i_\alpha \\ i_\beta \\ e_\alpha \\ e_\beta \end{bmatrix} + \begin{bmatrix} \dfrac{1}{L} & 0 \\ 0 & \dfrac{1}{L} \\ 0 & 0 \\ 0 & 0 \end{bmatrix} \begin{bmatrix} u_\alpha \\ u_\beta \end{bmatrix}$$

$$\begin{bmatrix} i_\alpha \\ i_\beta \end{bmatrix} = \begin{bmatrix} 1 & 0 & 0 & 0 \\ 0 & 1 & 0 & 0 \end{bmatrix} \begin{bmatrix} i_\alpha \\ i_\beta \\ e_\alpha \\ e_\beta \end{bmatrix}$$

Write $$\begin{bmatrix} -\frac{R}{L} & 0 & -\frac{1}{L} & 0 \\ 0 & -\frac{R}{L} & 0 & -\frac{1}{L} \\ 0 & 0 & 0 & -\omega \\ 0 & 0 & \omega & 0 \end{bmatrix}$$

as A, Write $$\begin{bmatrix} \frac{1}{L} & 0 \\ 0 & \frac{1}{L} \\ 0 & 0 \\ 0 & 0 \end{bmatrix}$$

as B, Write $$\begin{bmatrix} 1 & 0 & 0 & 0 \\ 0 & 1 & 0 & 0 \end{bmatrix}$$

as C. The A, B and C are the state matrix, input matrix and output matrix of the system respectively. Then the Luenberger observer can be constructed as:

$$\begin{bmatrix} \frac{d\hat{i}_\alpha}{dt} \\ \frac{d\hat{i}_\beta}{dt} \\ \frac{d\hat{\varepsilon}_\alpha}{dt} \\ \frac{d\hat{\varepsilon}_\beta}{dt} \end{bmatrix} = \begin{bmatrix} -\frac{R}{L} & 0 & -\frac{1}{L} & 0 \\ 0 & -\frac{R}{L} & 0 & -\frac{1}{L} \\ 0 & 0 & 0 & -\omega \\ 0 & 0 & \omega & 0 \end{bmatrix} \begin{bmatrix} \hat{i}_\alpha \\ \hat{i}_\beta \\ \hat{\varepsilon}_\alpha \\ \hat{\varepsilon}_\beta \end{bmatrix} + \begin{bmatrix} \frac{1}{L} & 0 \\ 0 & \frac{1}{L} \\ 0 & 0 \\ 0 & 0 \end{bmatrix} \begin{bmatrix} u_\alpha \\ u_\beta \end{bmatrix} + K \begin{bmatrix} i_\alpha - \hat{i}_\alpha \\ i_\beta - \hat{i}_\beta \end{bmatrix}$$

Since the PMSM is a nonlinear system, the relationship of the α axis and the β axis is nonlinear. The equations in the two-axis static coordinate system are symmetric, so the expression of the feedback matrix K can be expressed as follows:

$$K = \begin{bmatrix} K_1 & 0 \\ 0 & K_1 \\ K_2 & 0 \\ 0 & K_2 \end{bmatrix}$$

Wherein $K_1$ and $K_2$ are feedback coefficients which determine the performance of the observer.

The characteristic equation of the observer is:

$$|\lambda I - (A - KC)| = \lambda\left(\lambda + K_1 + \frac{R}{L}\right) - \frac{K_2}{L}\Big]^2 + \left(\lambda + K_1 + \frac{R}{L}\right)^2 \omega^2 =$$

$$\lambda^4 + 2\left(\frac{R}{L} + K_1\right)\lambda^3 + \left(\left(\frac{R}{L} + K_1\right)^2 + \omega^2 - \frac{2K_2}{L}\right)\lambda^2 +$$

$$\left(2\omega^2 - \frac{2K_2}{L}\right)\left(\frac{R}{L} + K_1\right)\lambda + \omega^2\left(\frac{R}{L} + K_1\right)^2 + \frac{K_2^2}{L^2} = 0$$

As a further technical solution, rewrite the characteristic equation as:

$$\left[\lambda\left(\lambda + K_1 + \frac{R}{L}\right) - \frac{K_2}{L}\right]^2 + \left(\lambda + K_1 + \frac{R}{L}\right)^2 \omega^2 = 0$$

And get a result as:

$$\lambda\left(\lambda + K_1 + \frac{R}{L}\right) - \frac{K_2}{L} = \pm\left(\lambda + K_1 + \frac{R}{L}\right)\omega j$$

Two equations can be obtained from the above results:

$$\lambda\left(\lambda + K_1 + \frac{R}{L}\right) - \frac{K_2}{L} - \left(\lambda + K_1 + \frac{R}{L}\right)\omega j = 0 \quad (1)$$

$$\lambda\left(\lambda + K_1 + \frac{R}{L}\right) - \frac{K_2}{L} + \left(\lambda + K_1 + \frac{R}{L}\right)\omega j = 0 \quad (2)$$

Let the pole of the state observer $\lambda = a+bj$, substitute into Equation (1):

$$a^2 - b^2 + \left(\frac{R}{L} + K_1\right)a + \omega b - \frac{K_2}{L} + \quad (3)$$

$$2abj + \left(\frac{R}{L} + K_1\right)bj - a\omega j + \left(K_1 + \frac{R}{L}\right)\omega j = 0$$

Because of the real part being equal to 0, the real part of the above Equation (3) can be written in the following form:

$$a^2 - b^2 + \left(\frac{R}{L} + K_1\right)a + \omega b - \frac{K_2}{L} = 0 \quad (4)$$

Because of the imaginary part being equal to 0, the imaginary part of the above Equation (3) can be written in the following form:

$$a^2 + \left(\frac{R}{L} + K_1\right)a + \frac{\omega^2\left(a + \frac{R}{L} + K_1\right)a}{\left(2a + \frac{R}{L} + K_1\right)^2} - \frac{K_2}{L} = 0 \quad (5)$$

Equation (5) is equivalent to:

$$a^4 + 2\left(\frac{R}{L} + K_1\right)a^3 + \left(\frac{5}{4}\left(\frac{R}{L} + K_1\right)^2 + \frac{1}{4}\omega^2 - \frac{K_2}{L}\right)a^2 + \quad (6)$$

$$\left(\frac{1}{4}\left(\left(\frac{R}{L} + K_1\right)^3 + \omega^2\left(\frac{R}{L} + K_1\right)\right) - \frac{K_2}{L}\left(\frac{R}{L} + K_1\right)\right)a - \frac{K_2}{4L}\left(\frac{R}{L} + K_1\right)^2 = 0$$

Similarly, the same result can be obtained by Equation (2). Therefore, the real part within the characteristic root of the characteristic equation of the observer must satisfy the Equation (6). If all the real roots of Equation (6) are in a certain range, then the real part of the characteristic root will also fall in that range.

According to the above Equation (6), when $R/L+K_1>0$ and $K_2<0$, the coefficients of the Equation are bigger than 0, then the real roots of the equation are less than 0. That is to say, the real part within the characteristic roots of the observer are less than 0, so that the system is stable.

As a further technical solution, the dominant pole can be obtained as $\lambda = -R/L$ from the state space equation. To achieve good system performance, the range of the observer pole should fall into the following range:

$$k_1\left(-\frac{R}{L}\right) > a > k_2\left(-\frac{R}{L}\right) \quad (7)$$

Wherein $k_1$ and $k_2$ need to be selected according to experience, and integers between 2 and 10 are generally desirable for the values. In order to make the subsequent derivation more concise, let:

$$x = k_1\left(\frac{R}{L}\right), y = k_2\left(\frac{R}{L}\right)$$

In addition, Equation (6) can be written as the following form:

$$(a+a_1)(a+a_2)(a+a_3)(a+a_4) = \quad (8)$$
$$a^4 + (a_1+a_2+a_3+a_4)a^3 + (a_1a_2+a_1a_3+a_1a_4+a_2a_3+a_2a_4+a_3a_4)a^2 +$$
$$(a_1a_2a_3+a_1a_2a_4+a_1a_3a_4+a_2a_3a_4)a + a_1a_2a_3a_4 = 0$$

Wherein $a_1$, $a_2$, $a_3$ and $a_4$ are arbitrary constants.

If the real part of the pole falls into the interval $(-y, -x)$ for the observer, $a_1$, $a_2$, $a_3$ and $a_4$ are set in the interval $(x, y)$, so:

$$x < a_1 < y; x < a_2 < y; x < a_3 < y; x < a_4 < y \quad (9)$$

Then, the reference ranges of $K_1$ and $K_2$ are obtained by using the above range.

As a further technical solution, the following is derived from the above condition (9):

$$4x < a_1 + a_2 + a_3 + a_4 < 4y \quad (10)$$
$$6x^2 < a_1a_2 + a_1a_3 + a_1a_4 + a_2a_3 + a_2a_4 + a_3a_4 < 6y^2 \quad (11)$$
$$4x^3 < a_1a_2a_3 + a_1a_2a_4 + a_1a_3a_4 + a_2a_3a_4 < 4y^3 \quad (12)$$
$$x^4 < a_1a_2a_3a_4 < y^4 \quad (13)$$

Equations (6) and (8) are equal, so:

$$4x < 2\left(\frac{R}{L} + K_1\right) < 4y \quad (14)$$

$$6x^2 < \frac{5}{4}\left(\frac{R}{L} + K_1\right)^2 + \frac{1}{4}\omega^2 - \frac{K_2}{L} < 6y^2 \quad (15)$$

$$4x^3 < \frac{1}{4}\left(\left(\frac{R}{L} + K_1\right)^3 + \omega^2\left(\frac{R}{L} + K_1\right)\right) - \frac{K_2}{L}\left(\frac{R}{L} + K_1\right) < 4y^3 \quad (16)$$

$$x^4 < -\frac{K_2}{4L}\left(\frac{R}{L} + K_1\right)^2 < y^4 \quad (17)$$

Simplifying inequality (14), it yields:

$$2x < \frac{R}{L} + K_1 < 2y \quad (18)$$

By organizing Inequality (15), the range of $K_2$ can be expressed as:

$$-L\left(6y^2 - \frac{5}{4}\left(\frac{R}{L} + K_1\right)^2 - \frac{1}{4}\omega^2\right) < K_2 < -L\left(6x^2 - \frac{5}{4}\left(\frac{R}{L} + K_1\right)^2 - \frac{1}{4}\omega^2\right) \quad (19)$$

By organizing Inequality (16), the range of $K_2$ can also be expressed as:

$$-L\left(\frac{4y^3}{\left(\frac{R}{L} + K_1\right)} - \frac{1}{4}\left(\left(\frac{R}{L} + K_1\right)^2 - \frac{1}{4}\omega^2\right)\right) < K_2 < -L\left(\frac{4x^3}{\left(\frac{R}{L} + K_1\right)} - \frac{1}{4}\left(\left(\frac{R}{L} + K_1\right)^2 - \frac{1}{4}\omega^2\right)\right) \quad (20)$$

From Inequation (17), the range of $K_2$ can be written as:

$$\frac{-4Ly^4}{\left(\frac{R}{L} + K_1\right)^2} < K_2 < \frac{-4Lx^4}{\left(\frac{R}{L} + K_1\right)^2} \quad (21)$$

From the above in equations, it can be inferred that when $K_1$ is determined, the range of $K_2$ can be calculated.

To obtain a more convenient and simpler expression, let the $R/L+K_1$ on the left of Inequation (19) equal to $2y$, and let the $R/L+K_1$ on the right of Inequation (19) equal to $2x$, so:

$$\frac{-4Ly^4}{\left(\frac{R}{L} + K_1\right)^2} < -L\left(y^2 - \frac{1}{4}\omega^2\right) < K_2 < -L\left(x^2 - \frac{1}{4}\omega^2\right) < \frac{-4Lx^4}{\left(\frac{R}{L} + K_1\right)^2} \quad (22)$$

Inequality (22) can also be derived from Inequality (20), further verifying the correctness of Inequality (22).

By the same reason, get the following inequation from Inequation (21):

$$-Ly^2 < K_2 < -Lx^2 \quad (23)$$

By the above inequation, the feedback coefficients $K_1$ and $K_2$ can be selected in the following reference ranges:

$$\begin{cases} 2x - \frac{R}{L} < K_1 < 2y - \frac{R}{L} \\ -L\left(y^2 - \frac{1}{4}\omega^2\right) < K_2 < -Lx^2 \end{cases} \quad (24)$$

When x and y are bigger than 0, it is known that $R/L+K_1>0$ and $K_2<0$, so the system meets the stability requirements.

It should be noted that the range of the feedback coefficient obtained by this method cannot guarantee that the pole of the system falls into the target range. Clearly, when the system poles fall within the target range, the feedback coefficients will inevitably fall within the range given by Inequality (24). Therefore, Inequations (24) can be used as the reference range to select the feedback coefficient under the condition that the stability is satisfied. Furthermore, when the rotation speed affects the pole position of the observer greatly, the feedback coefficient can be adjusted to some extent according to the Inequations (24).

The present invention also provides a PMSM sensorless control system based on Luenberger observer, including a power supply circuit, a sampling circuit, a main control circuit, a drive circuit.

The power supply circuit is connected to a DC power. The energy supply of other circuits comes from the power supply circuit.

The sampling circuit is connected to the PMSM, collecting the two-end voltage of the sampling resistance in series connection on each phase of the three-phase PMSM, and transmits the signal to the main control chip to calculate the three-phase current.

The main control circuit is connected to the drive circuit, and the output control signal is sent to the drive circuit to drive the motor.

By employing the technical solution described above, compared with the prior art, the present disclosure has the beneficial effects as follows:

1) In the present disclosure, a new selection method of Luenberger observer is proposed for selecting feedback coefficient, which is more convenient and effective than conventional method does. Specifically, with obtaining motor parameters in advance, it is quickly to get a small reference range of feedback coefficient according to the inequations given by this present disclosure, and consequently the observer performance can be guaranteed.
2) In the present disclosure, the stability conditions of the observer system are given, which ensure the stability of the system.
3) In the present disclosure, we have made good use of global parameters. In other words, the feedback coefficient can be automatically adjusted by the Inequations given in this present methodology to get better observer performance, especially when the rotation speed fluctuation has a great influence on the pole position of the observer.
4) In conclusion, suitable feedback coefficients can be obtained quickly by the improved Luenberger observer. This Luenberger observer has a good adaptive ability so that the control system achieve more stable performance, and its response is very fast.

DETAILED DESCRIPTION OF THE EMBODIMENTS

In order to make the objective, technical solution, and advantages of the present disclosure much more clearer and easier to understand, the present disclosure is further described in detail below with reference to the accompanying drawings. It should be understood that the specific embodiments described herein are merely illustrative of the present disclosure, and not intended to limit the present disclosure.

On the contrary, the present disclosure is to encompass any alternatives, modifications, equivalents, and solutions made within the spirit and scope of the present disclosure, as defined by the appended claims. Further, in the follow detailed description of the present disclosure, some specific details are described thoroughly, so that people will have a better understanding of the present disclosure. Those skilled in the art may also fully understand the present disclosure without these details.

Figure 1:
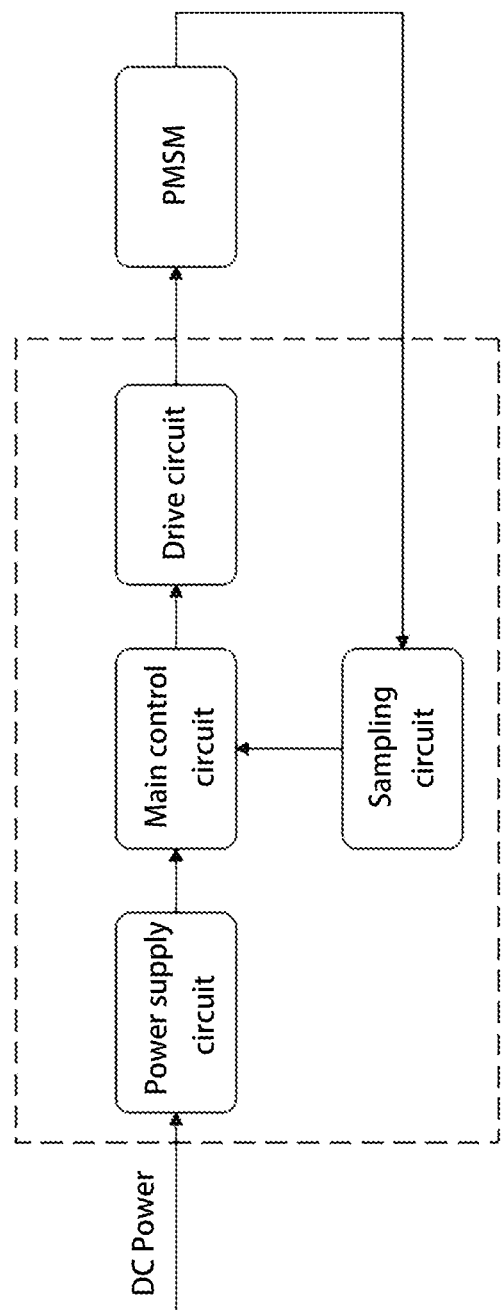
FIG. 1 is a structure diagram of the PMSM control system provided in the present embodiment.

As shown in FIG. 1 is the structure diagram of the PMSM control system of the present invention. The system includes a power supply circuit, a sampling circuit, a main control circuit and a drive circuit. The external DC power is connected to the power supply circuit.

Figure 2:
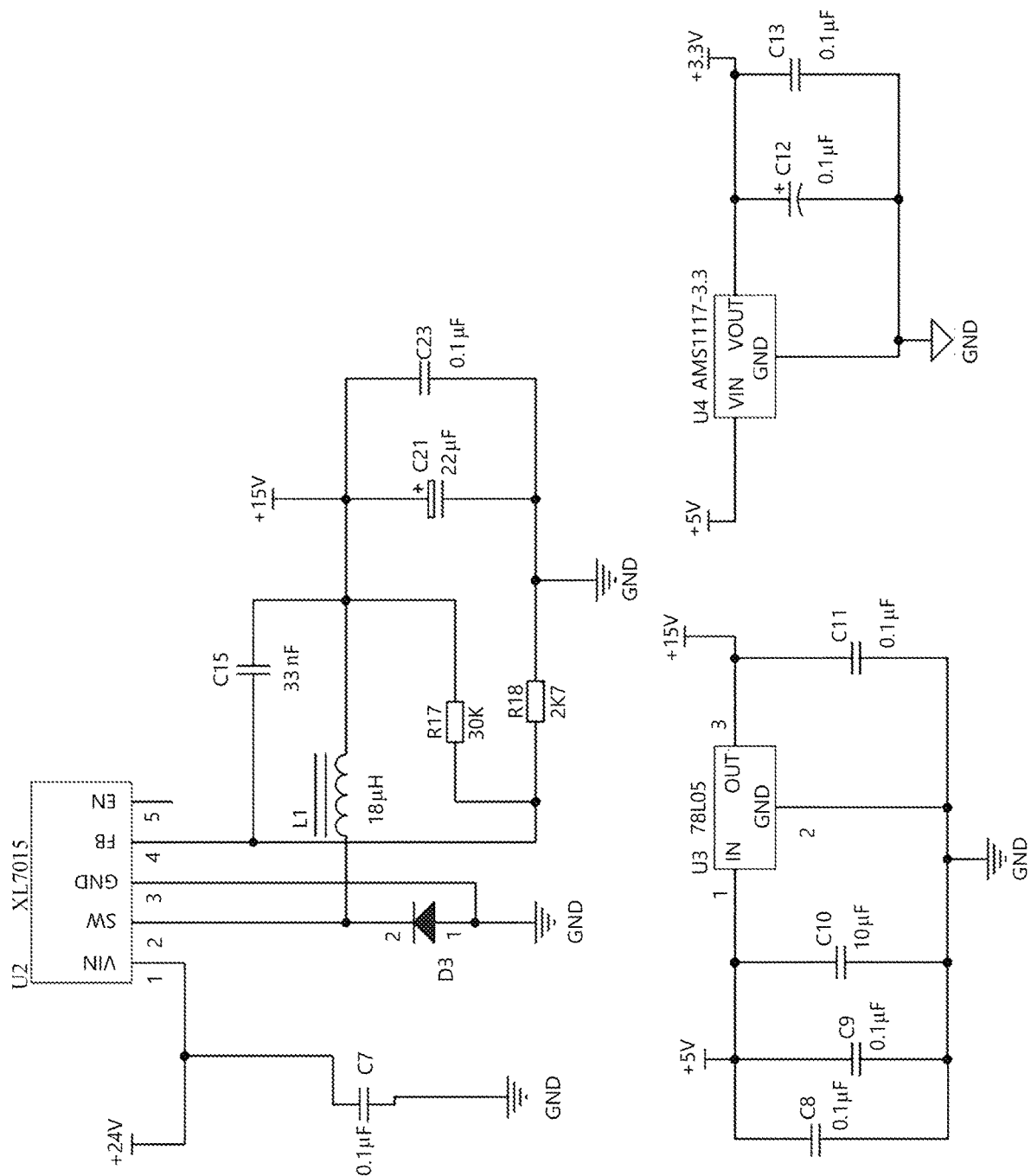
FIG. 2 is a schematic diagram of the power supply circuit provided in this embodiment.

As shown in FIG. 2, it is a schematic diagram of the power supply circuit of a specific embodiment of the present invention. There are three BUCK circuits that reduce the DC power voltage to 15V, 5V and 3.3V respectively. Wherein 15V supplies power for the drive circuit, and 3.3V for the main control circuit.

Figure 3:
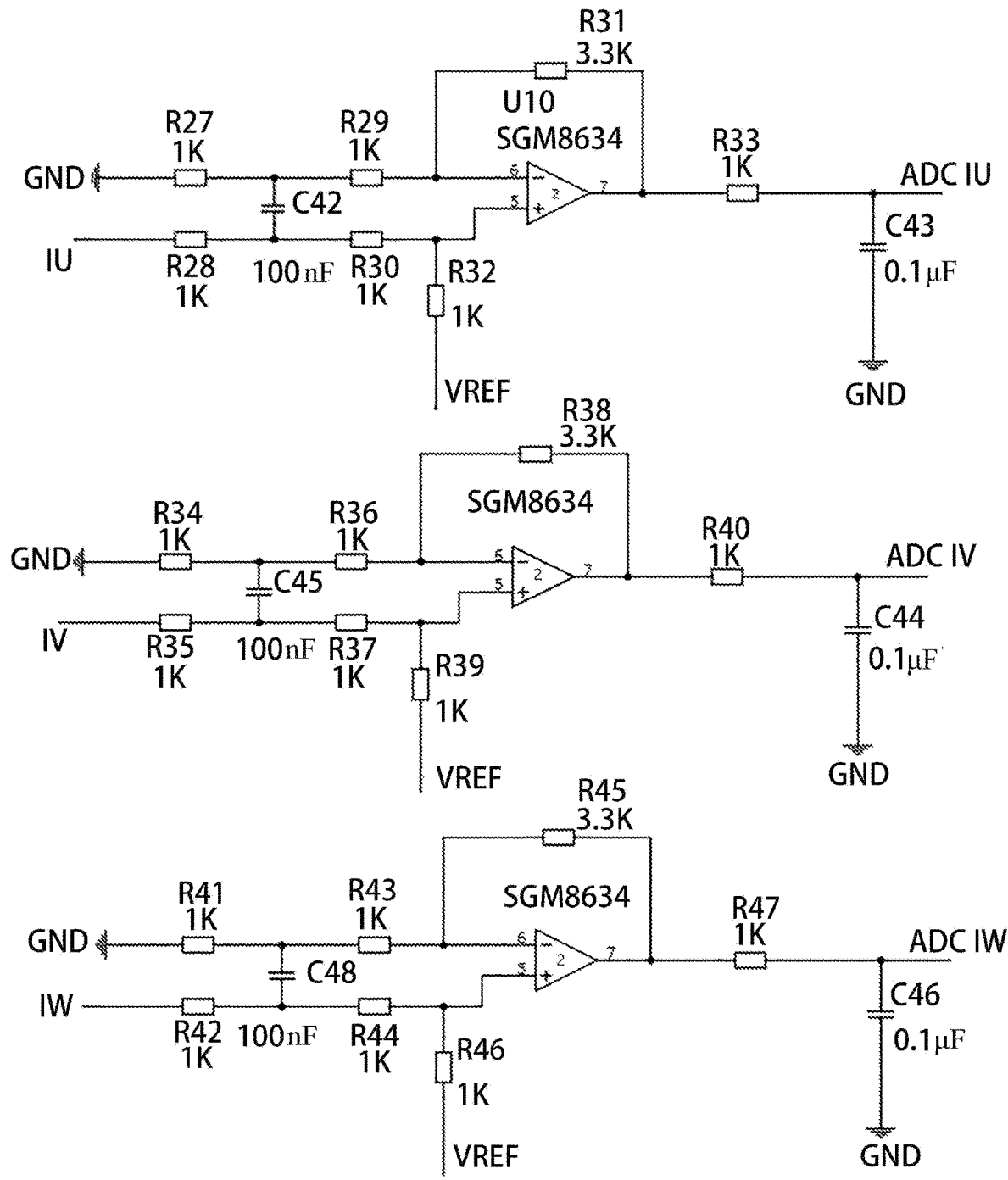
FIG. 3 is a schematic diagram of the sampling circuit provided in this embodiment.

As shown in FIG. 3, it is a schematic diagram of the sampling circuit of a specific embodiment of the present invention. The circuit amplifies the two-end voltage of the sampling resistance through an operational amplifier, and then transmits the amplified voltage signal to the main control chip. The sampled current can be calculated by using the voltage signal and the value of sampling resistance.

Figure 4:
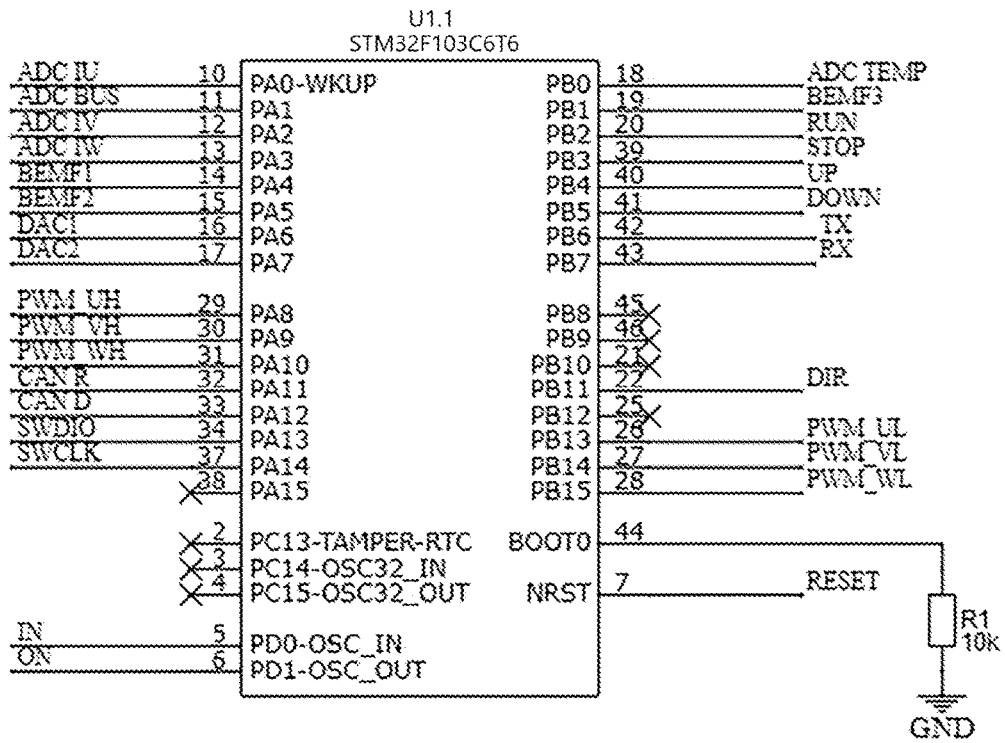
FIG. 4 is a schematic diagram of the main control circuit provided in this embodiment.
Figure 4:
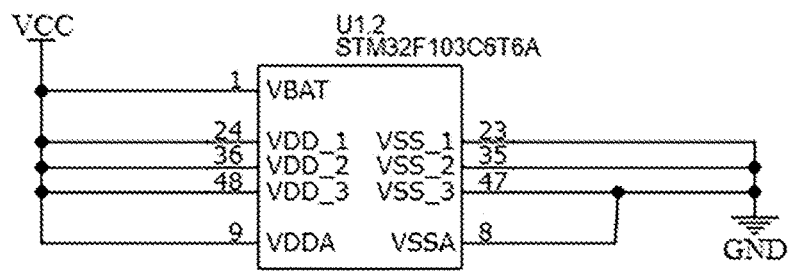
Figure 4:
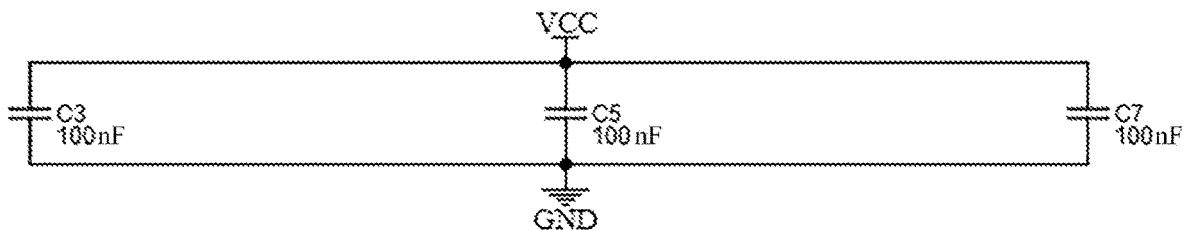

As shown in FIG. 4, it is a schematic diagram of the main control circuit of a specific embodiment of the present invention. It consists of a microcontroller and its peripheral circuit. The microcontroller can perform the motor control algorithm, and output the control signal to the drive circuit.

Figure 5:
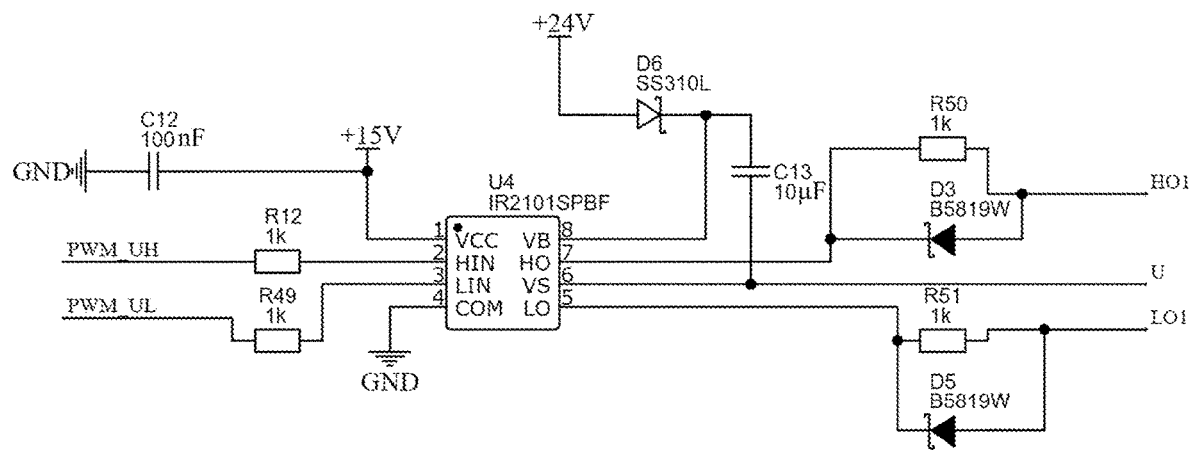
FIG. 5 is a schematic diagram of the drive circuit provided in this embodiment.
Figure 5:
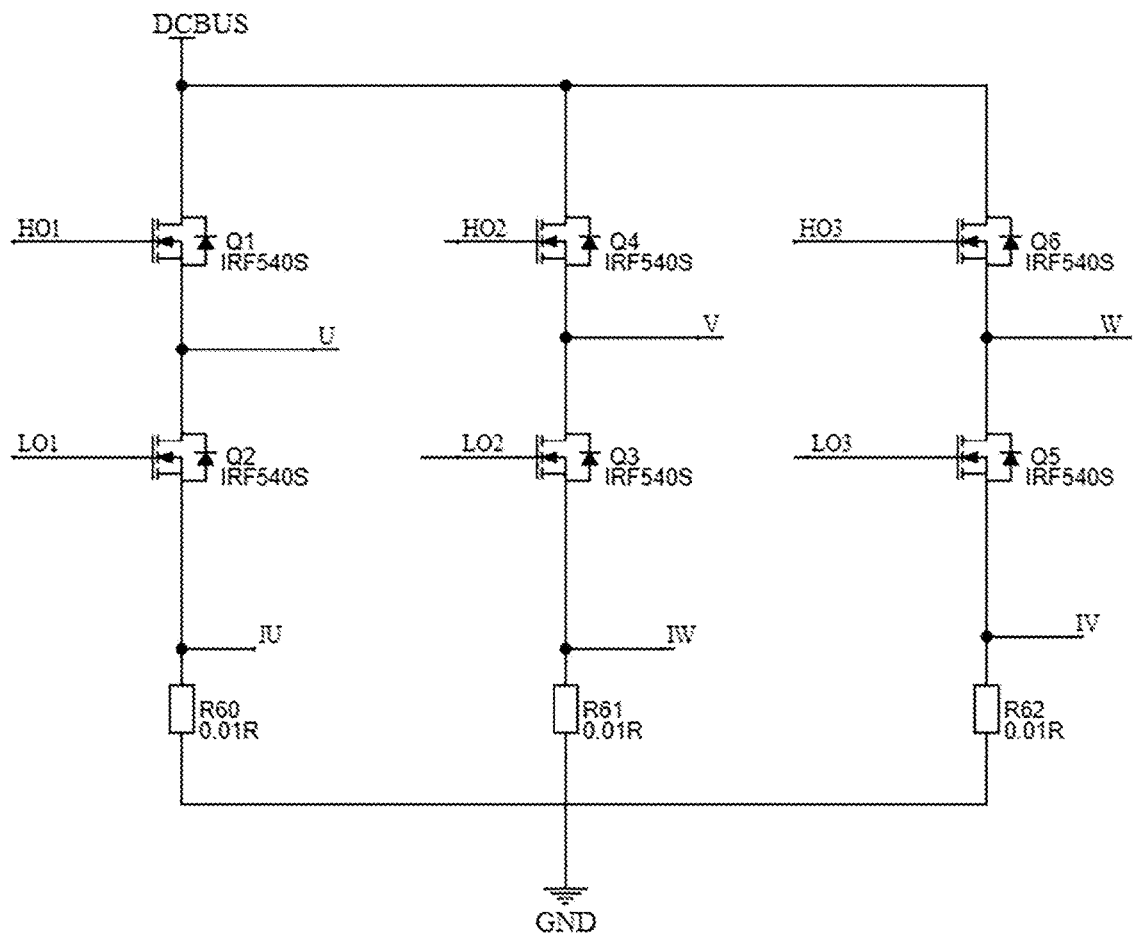

As shown in FIG. 5, it is a schematic diagram of the drive circuit of a specific embodiment of the present invention, consisting of a pre-drive circuit and a three-phase full-bridge inverting circuit. The pre-drive circuit changes the switching state of the MOSFET in the circuit, according to the input control signal to drive the motor.

The specific process of the motor control algorithm is as follows:
1) Starting the motor with open-loop manner, and running the motor at a certain speed level, three-phase circuit of $I_a$, $I_b$, $I_c$ can be obtained by sampling.
2) The three-phase current and the given three-phase voltage are transformed by the Clack Transformation, so the stator currents of $I_\alpha$, $I_\beta$ as well as the voltages of $U_\alpha$, $U_\beta$ can be obtained in the Two-phase stationary coordinate system.

3) The Luenberger observer is then constructed in the two-phase stationary coordinate system, according to the motor parameter of resistance R and inductor L.

Figure 6:
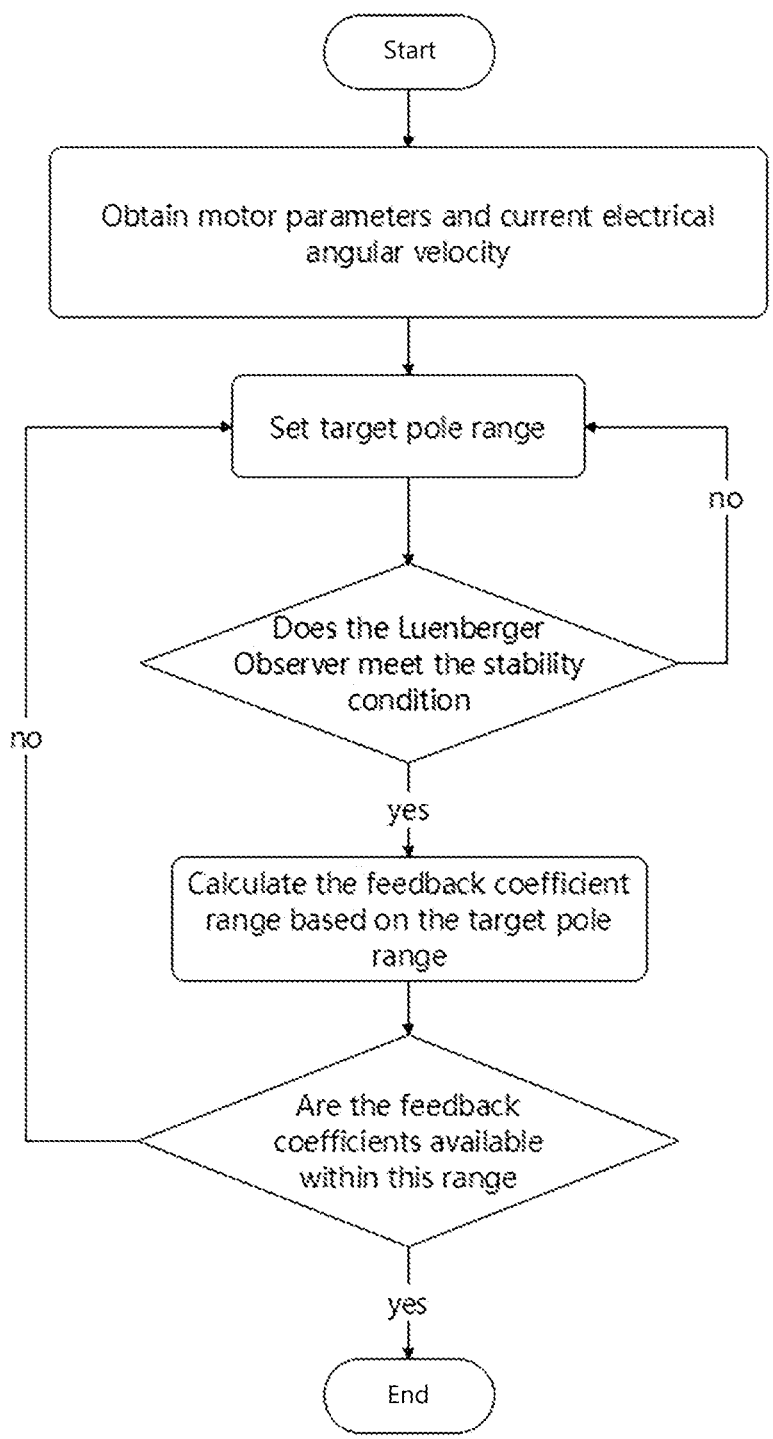
FIG. 6 is a flow chart of the feedback coefficient selection method provided in this embodiment.

4) The improved selection method on feedback coefficient of Luenberger observer is used to obtain the appropriate feedback coefficient quickly, and the observer have good performance in a wide speed range. The concrete procedure of the improved selection method is shown in FIG. 6 for selecting feedback coefficient.

5) After the estimated back-EMF is obtained using the Luenberger observer, the PLL is used to obtain the estimated rotor position θ and the estimated rotational speed ω.

6) $I_\alpha$, $I_\beta$ are transformed to the stator current of $I_d$, $I_q$ in the two-phase rotational coordinate system by Park Transformation. And then, according to the estimated speed w and the given target speed wo, the speed closed-loop is established, the output of which are the target current $I_{d0}$ and $I_{q0}$. Then, the current closed-loop is constructed using the current of $I_d$, $I_q$, then obtaining the stator voltages of $U_d$, $U_q$ in the two-phase rotational coordinate system. After that, the Anti-Park Transformation is used to obtain the new stator voltages of $U_\alpha$, $U_\beta$ in the two-phase stationary coordinate system.

7) Finally, the SVPWM (Space Vector Pulse Width Modulation) is modulated with $U_\alpha$ and $U_\beta$, so the sensorless control of the PMSM is realized.

Table 1 lists the PMSM parameters provided in this embodiment. Next, take this motor as an example to illustrate the selection method on feedback coefficient with the improved Luenberger observer.

TABLE 1

Parameters of PMSM adopted in present example

| | |
|---|---|
| Rated Voltage (V) | 24 |
| The Number of Pole-pairs | 2 |
| Phase Resistance (Ω) | 0.3 |
| Phase Inductance (H) | 0.000375 |
| Counter Electromotive Force Constant (V · kRPM) | 6.23 |
| Rotational Inertia (g · cm²) | 120 |

Figure 7:
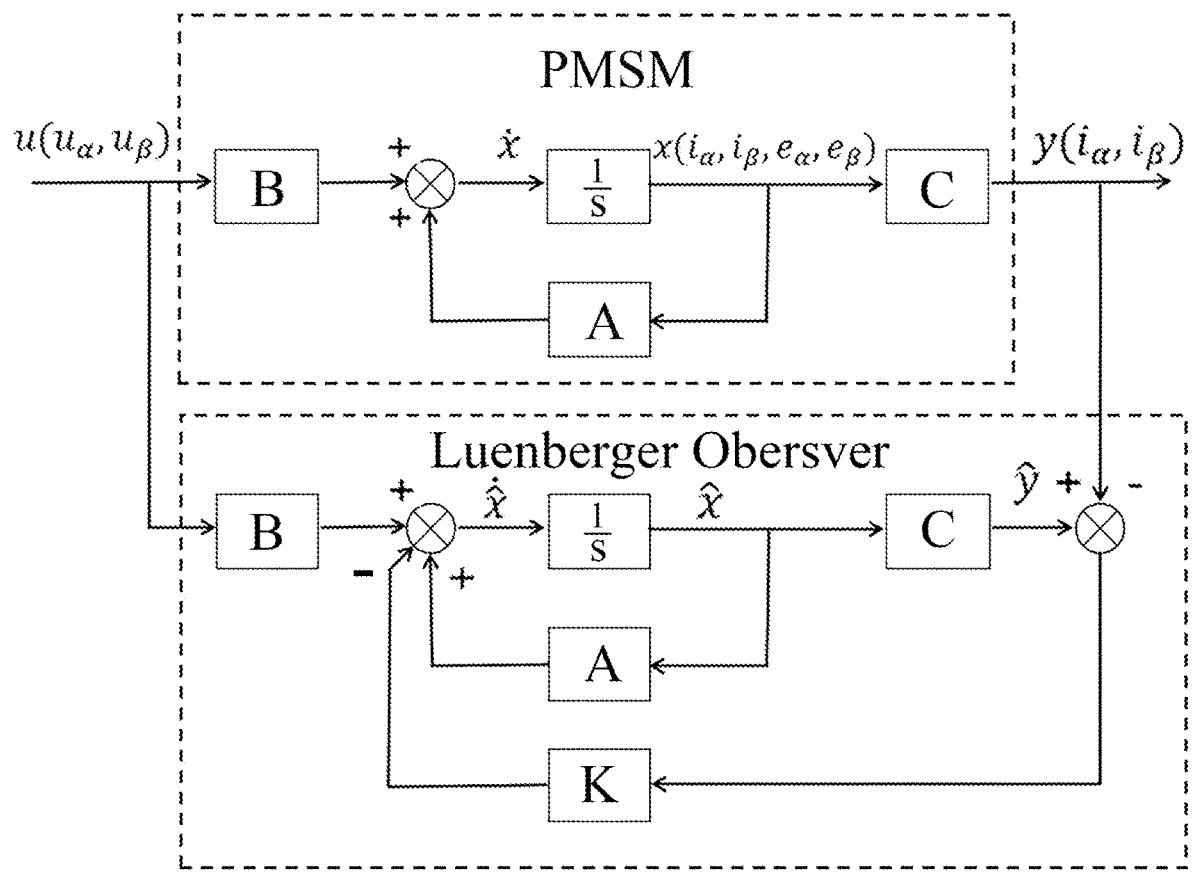
FIG. 7 is a block diagram of the Luenberger observer structure provided in this embodiment.

As shown in FIG. 7, the structure diagram of the Luenberger observer is provided in this embodiment. The A, B, and C are the state matrix, input matrix and output matrix of the system respectively. The K is the feedback gain matrix. The parameters $K_1$ and $K_2$ in the feedback matrix are the feedback coefficients which determine the performance of the observer. Therefore, the feedback coefficients are the key to design Luenberger observer. By utilizing the parameter selection method adopted by the improved Luenberger observer, good feedback coefficients can be quickly obtained, including the following steps:

Step 1: according to the system state matrix A, the poles of the motor control system can be obtained as:

$$\lambda_{1,2} = -\frac{R}{L}, \lambda_{3,4} = \pm jp\omega$$

Considering the main poles of the system $\lambda_{1,2}$, substitute the motor parameters into the above equation to obtain $\lambda_{1,2} = -800$.

Step 2: the target pole range is given as:

$$0 > k_1\left(-\frac{R}{L}\right) > \lambda_{1,2,3,4} > k_2\left(-\frac{R}{L}\right)$$

Taking $k_1=2.5$, $k_2=3$ by experience:

$$x = k_1\left(\frac{R}{L}\right) = 2000$$

$$y = k_2\left(\frac{R}{L}\right) = 2400$$

Step 3: Giving the selection range of the feedback coefficient through the following in equations:

$$\begin{cases} 2x - \frac{R}{L} < K_1 < 2y - \frac{R}{L} \\ -L\left(y^2 - \frac{1}{4}\omega^2\right) < K_2 < -Lx^2 \end{cases}$$

The results are obtained by substituting x, y, R and L into the above in equations, which are given as:

$$\begin{cases} 3200 < K_1 < 4000 \\ -2160 + 0.09375\omega^2 < K_2 < -1500 \end{cases}$$

The values of $K_1$, $K_2$ can be selected within the above range according to the actual value of the electric angular speed. Generally, the middle value is selected between the above range.

In order to make the observer perform well in the wide speed range, taking the electric angular speed equal to 0, the $K_1$, $K_2$ will fall into the following range:

$$\begin{cases} 3200 < K_1 < 4000 \\ -2160 < K_2 < -1500 \end{cases}$$

And taking the electric angular speed equal to the maximum, for example ω=1000, then:

$$\begin{cases} 3200 < K_1 < 4000 \\ -2066 < K_2 < -1500 \end{cases}$$

To sum up the above steps, $K_1=3600$ and $K_2=-1800$ are recommended accordingly, which make the PMSM run stably in the wide speed range.

Step 4: Verifying the stability condition of $R/L+K_1>0$ and $K_2<0$, and the obtained parameters herein can stabilize the control system.

Step 5: Conducting parameter debugging. If the obtained parameters make the observer performance poor, then return to step 2 to give another target pole range. Generally, the selected $k_1$ is not less than 2, the $k_2$ is not more than 10, so taking the multiple of 0.5 as the debugging factor.

Figure 8:
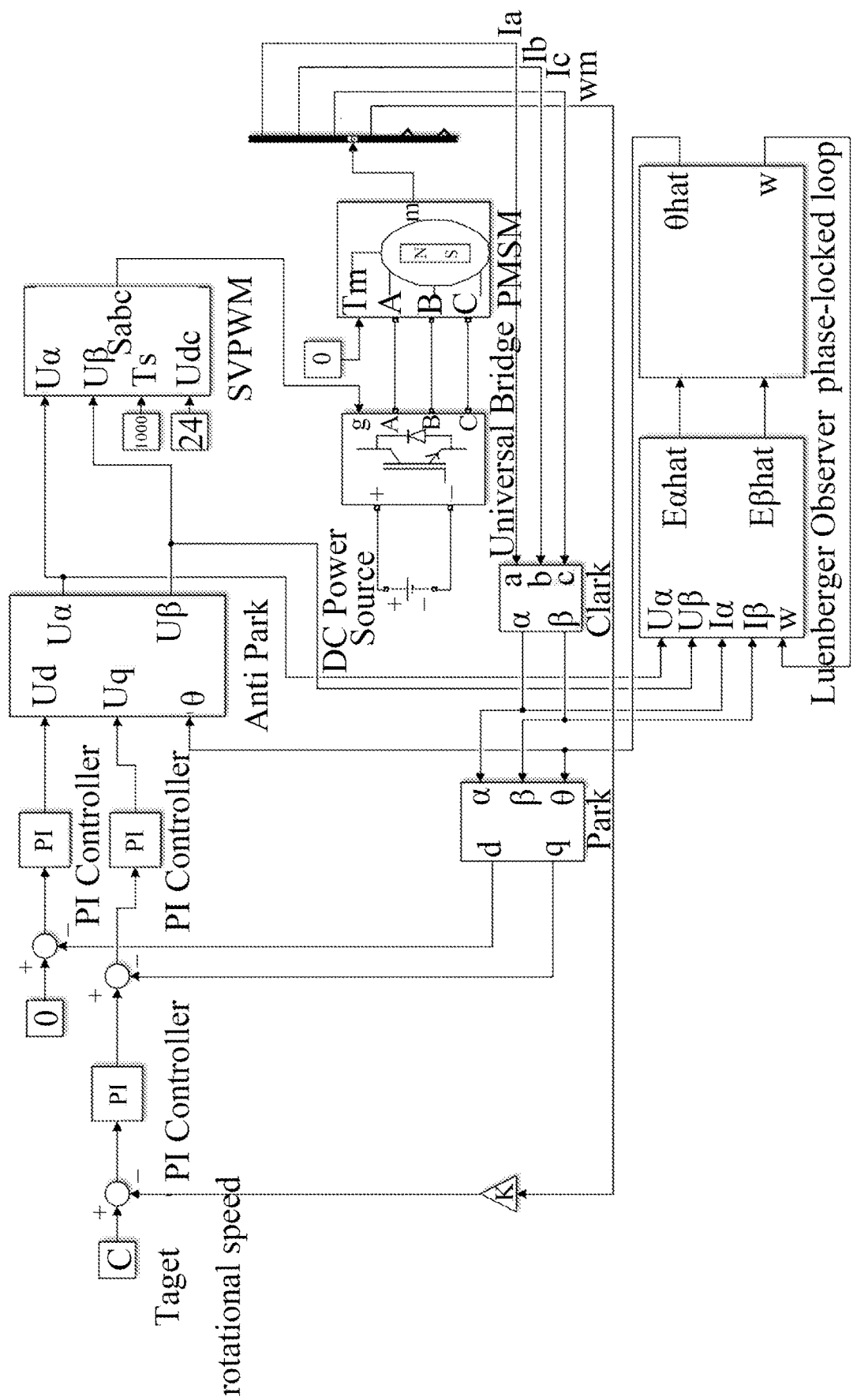
FIG. 8 is a simulation model of a PMSM using the improved Luenberger observer provided in this embodiment.
Figure 9:
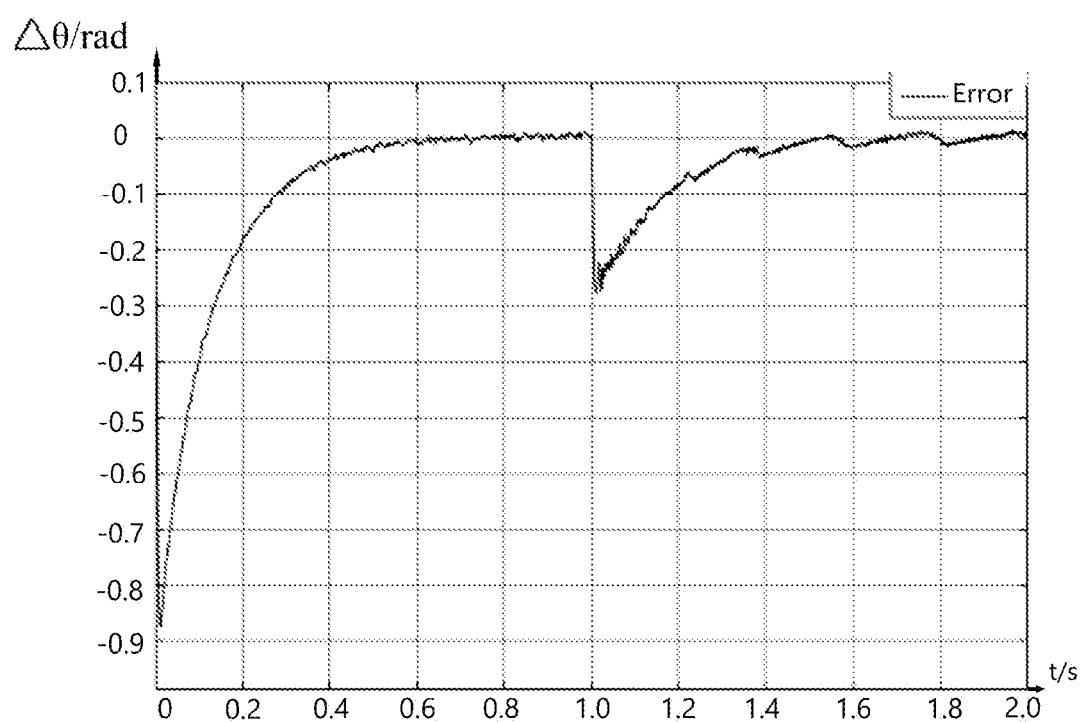
FIG. 9 is a simulation diagram of the rotor position estimation under the sudden change of rotational speed as provided in this embodiment.

As shown in FIG. 8, the simulation model is established through the Simulink module of MATLAB, using the motor parameters given in Table 1. The Luenberger observer is constructed with the feedback coefficients selected by Step 3. During the simulation, the motor speed is accelerated from 1000 r/min to 2500 r/min after 1 second in the simulation. The difference Δθ between the actual and estimated values of the electric angle is shown in FIG. 9. The convergence rate of the observer error is relatively fast, and it can also be converged quickly when the rotational speed fluctuation takes place, which has a good performance in the wide speed range.

The improved Luenberger observer is designed with the selected parameter, which has good performance in this embodiment.

Figure 10:
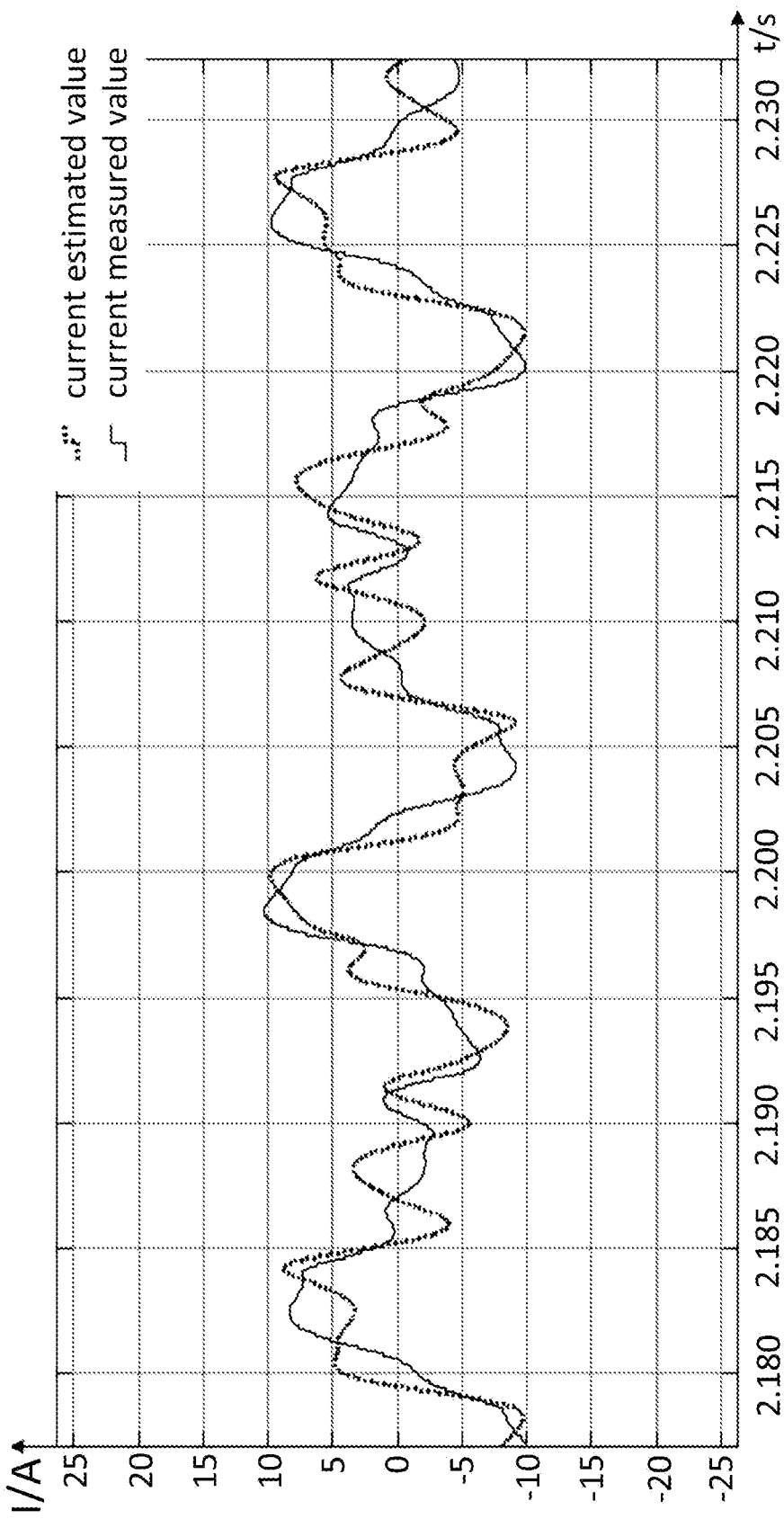
FIG. 10 is a simulation diagram of the current measurement value and the observer current estimation of the $\alpha$ phase when the feedback coefficients are $K_1=360$ and $K_2=-180$ provided in this embodiment.

It is worth noting that the feedback coefficients can almost only be found by referring to stability conditions, if use the trial-and-error method. For example, the stability condition of this embodiment is $K_1 > -800$ and $K_2 < 0$, which is a very broad range. The performance of the observer may not meet the application requirements if the feedback coefficient is randomly selected within this broad range. FIG. 10 shows the current measurements and observer current estimations of the a phase with the feedback coefficient of $K_1 = 360$ and $K_2 = -180$. It can be seen that although the feedback coefficient satisfies the stability condition, the error between the measurement and estimation is unacceptably large, and the motor does not run properly. It will take more time for debugging to find the right value. In addition, the feedback coefficient obtained by the trial-and-error method may only be suitable for a certain speed segment. When the rotating speed changes greatly, the observer performance may not reach the target level, so it takes more time to carry out parameter debugging by using traditional method.

What is claimed is:

1. A sensorless control system for a permanent magnet synchronous motor (PMSM), the system comprising:
   a power supply circuit configured to receive a direct current (DC) power and to supply energy to other components of the system;
   a sampling circuit coupled to the PMSM, the sampling circuit being configured to sample a voltage across a sampling resistor connected in series with a phase winding of the PMSM and to output a signal representative of a phase current of the PMSM;
   a main control circuit, comprising a microcontroller and a memory storing computer-executable instructions, the main control circuit being coupled to the sampling circuit to receive the signal representative of the phase current and being coupled to a drive circuit, the main control circuit being configured to:
   transform the sampled three-phase current into a two-phase current (Iα, Iβ) in a stationary coordinate system;
   design a Luenberger observer model in the stationary coordinate system based on a resistance (R) and an inductance (L) of the PMSM, and on the two-phase current and a two-phase voltage;
   calculate and select a feedback coefficient ($K_1$, $K_2$) for the Luenberger observer model based on a parameter selection method to obtain optimal feedback coefficients;
   obtain an estimated back electromotive force (back-EMF) via the Luenberger observer;
   calculate an estimated electrical angle (θ) from the estimated back-EMF using a phase-locked loop (PLL), and derive an estimated angular velocity (ω) from the estimated electrical angle;
   establish a speed closed-loop control using the estimated electrical angle and the estimated angular velocity;
   transform the two-phase current (Iα, Iβ) into a stator current (Id, Iq) in a rotational coordinate system;
   establish a current closed-loop control using the stator current (Id, Iq) to obtain a stator voltage (Ud, Uq) in the rotational coordinate system;
   modulate a space vector pulse width modulator (SVPWM) using the stator voltage (Ud, Uq) and the estimated rotor position (θ) to generate a pulse width modulation (PWM) signal; and
   wherein the drive circuit is configured to receive the PWM signal and drive the PMSM based on the PWM signal to generate a rotating magnetic field, thereby achieving sensorless field-oriented control (FOC) of the PMSM.

2. The system of claim 1, wherein the parameter selection method for the feedback coefficient ($K_1$, $K_2$) of the Luenberger observer comprises:
   performing a stability analysis of the Luenberger observer;
   obtaining a target pole range of the observer system based on poles of the motor control system of the PMSM;
   determining a reference range for the feedback coefficients ($K_1$, $K_2$) from the target pole range; and
   selecting values for the feedback coefficients ($K_1$, $K_2$) within the reference range.

3. The system of claim 2, wherein the PMSM is a surface-mounted motor, and a voltage balance equation in the two-phase stationary coordinate system is:

$$[V\alpha; V\beta] = R^*[I\alpha; I\beta] + [\partial/\partial t(L^*I\alpha); \partial/\partial t(L^*I\beta)] + [e\alpha; e\beta]$$

wherein eα and eβ represent components of the back-EMF.

4. The system of claim 3, wherein the Luenberger observer is constructed based on a state space model derived from the voltage balance equation, and wherein a feedback matrix (K) of the observer is expressed as:

$$K = [K1, -K2; K2, K1]$$

where K1 and K2 are the feedback coefficients.

5. The system of claim 4, wherein a characteristic equation of the Luenberger observer is analyzed to determine stability conditions, and wherein the stability conditions require $(R/L + K1) > 0$ and $K2 < 0$ to ensure stability of the observer system.

6. The system of claim 5, wherein the target pole range for the observer system is defined as:

$$-k2^*(R/L) < \text{Re}(\lambda) < -k1^*(R/L)$$

where λ represents the poles of the observer, Re (λ) represents the real part of λ, and k1 and k2 are positive integers selected from a range between 2 and 10.

7. The system of claim 6, wherein the reference range for selecting the feedback coefficients K1 and K2 is given by the inequalities:

$$2x - R/L < K1 < 2y - R/L - ((R/L + K1)^2 - (2x)^2)/(4\omega) < K2 < -((R/L + K1)^2 - (2y)^2)/(4\omega)$$

wherein x and y are derived from the target pole range, and w is an electrical angular velocity.

8. A sensorless control method for a permanent magnet synchronous motor (PMSM), the method comprising:
   sampling a three-phase current of the PMSM in real-time;
   transforming the three-phase current into a two-phase current (Iα, Iβ) under a stationary coordinate system;
   designing a Luenberger observer according to a resistance (R) and an inductance (L) of the PMSM, and the two-phase current and a two-phase voltage;
   calculating and selecting a feedback coefficient ($K_1$, $K_2$) with a parameter selection method to obtain optimal feedback coefficients;
   obtaining an estimated back electromotive force (back-EMF) through the Luenberger observer;

calculating an estimated electrical angle (θ) by a phase-locked loop (PLL) based on the estimated back-EMF, and consequently obtaining an estimated angular velocity (ω);
establishing a speed closed-loop control using the estimated electrical angle and the estimated angular velocity;
obtaining a stator current (Id, Iq) under a rotational coordinate system;
constructing a current closed-loop control to obtain a stator voltage (Ud, Uq) under the rotational coordinate system;
modulating a space vector pulse width modulator (SVPWM) by using the stator voltage (Ud, Uq) and the estimated rotor position (θ); and
outputting a corresponding pulse width modulation (PWM) signal to a drive circuit to control the PMSM, thereby completing sensorless field-oriented control (FOC) of the PMSM.

* * * * *